US007917119B2

United States Patent
Matsumoto

(10) Patent No.: US 7,917,119 B2
(45) Date of Patent: Mar. 29, 2011

(54) BAND CONTROL APPARATUS, BAND CONTROL PROGRAM AND BAND CONTROL METHOD

(75) Inventor: Kunikazu Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1127 days.

(21) Appl. No.: 11/445,145

(22) Filed: Jun. 2, 2006

(65) Prior Publication Data

US 2007/0218858 A1 Sep. 20, 2007

(30) Foreign Application Priority Data

Mar. 16, 2006 (JP) .................................. 2006-073246

(51) Int. Cl.
*H04B 1/26* (2006.01)
(52) U.S. Cl. ...................... 455/326; 455/450; 455/452.1; 455/452.2; 379/201.01
(58) Field of Classification Search .................. 455/326, 455/450, 452.1, 452.2; 379/201.01
See application file for complete search history.

(56) References Cited

U.S. PATENT DOCUMENTS

| 6,725,253 | B1 | 4/2004 | Okano et al. ................... 709/203 |
| 2004/0184483 | A1 | 9/2004 | Okamura et al. | |
| 2004/0213395 | A1* | 10/2004 | Ishii et al. ................. 379/201.01 |
| 2005/0015471 | A1 | 1/2005 | Zhang et al. ................... 709/221 |
| 2006/0039335 | A1 | 2/2006 | Ono et al. | |

FOREIGN PATENT DOCUMENTS

| EP | 1 453 243 | 9/2004 |
| JP | 2002-314584 | 10/2002 |
| JP | 2004-236198 | 8/2004 |
| JP | 2006-60579 | 3/2006 |

OTHER PUBLICATIONS

Extend European Search Report issued Mar. 14, 2007 in corresponding European Patent Application No. 06116284.8-2416 (9 pages).
Japanese Patent Office Action mailed Sep. 14, 2010 for corresponding Japanese Patent Application No. 2006-073246.

* cited by examiner

*Primary Examiner* — Tuan H Nguyen
(74) *Attorney, Agent, or Firm* — Staas & Halsey LLP

(57) ABSTRACT

A band control apparatus, a band control program and a band control method that control bands takes the cost into consideration. A band control apparatus $1a$ for relaying signals by using at least one of a plurality of lines $2a$, $2b$, $3$ that is connected to some other band control apparatus $1b$ by way of the plurality of lines and adapted to cooperate with the other band control apparatus $1b$ to control the bands of the plurality of lines comprises communication status gauging sections $15a$, $15b$, $15c$ that gauge the communication status of the own apparatus on the plurality of lines $2a$, $2b$, $3$ as first communication status and a band control section $16$ that acquires the communication status of the band control apparatus $1b$ on the plurality of lines $2a$, $2b$, $3$ as second communication status, computationally determines the line status of each of the lines according to the first communication status and the second communication status acquired and allocates the bands to be used for the relay to the plurality of lines $2a$, $2b$, $3$ according to the line statuses.

20 Claims, 10 Drawing Sheets

FIG. 4

| MONDAY | A (NOT-WARRANTING TYPE) | B (NOT-WARRANTING TYPE) | C (WARRANTING TYPE) | (Mbps) |
|---|---|---|---|---|
| 0:00 | 24 | 18 | | |
| 1:00 | 22 | 19 | | |
| 2:00 | 20 | 18 | | |
| 3:00 | 16 | 13 | | |
| 4:00 | 14 | 7 | | |
| 5:00 | 10 | 3 | 7 | |
| ... | ... | ... | | |
| 23:00 | 20 | 8 | | |

FIG. 9

| TITLE OF APPLICATION | REQUIRED BAND [BPS] | COST EFFECTIVENESS | OVERTIME METER USE |
|---|---|---|---|
| VoIP | 1M | 200 | CONTINUE |
| TV CONFERENCE | 30M | 2000 | DISCONTINUE |
| Web | NO LIMIT | 1 | DISCONTINUE |
| Mail | NO LIMIT | 10 | CONTINUE |
| DB | NO LIMIT | 500 | CONTINUE |

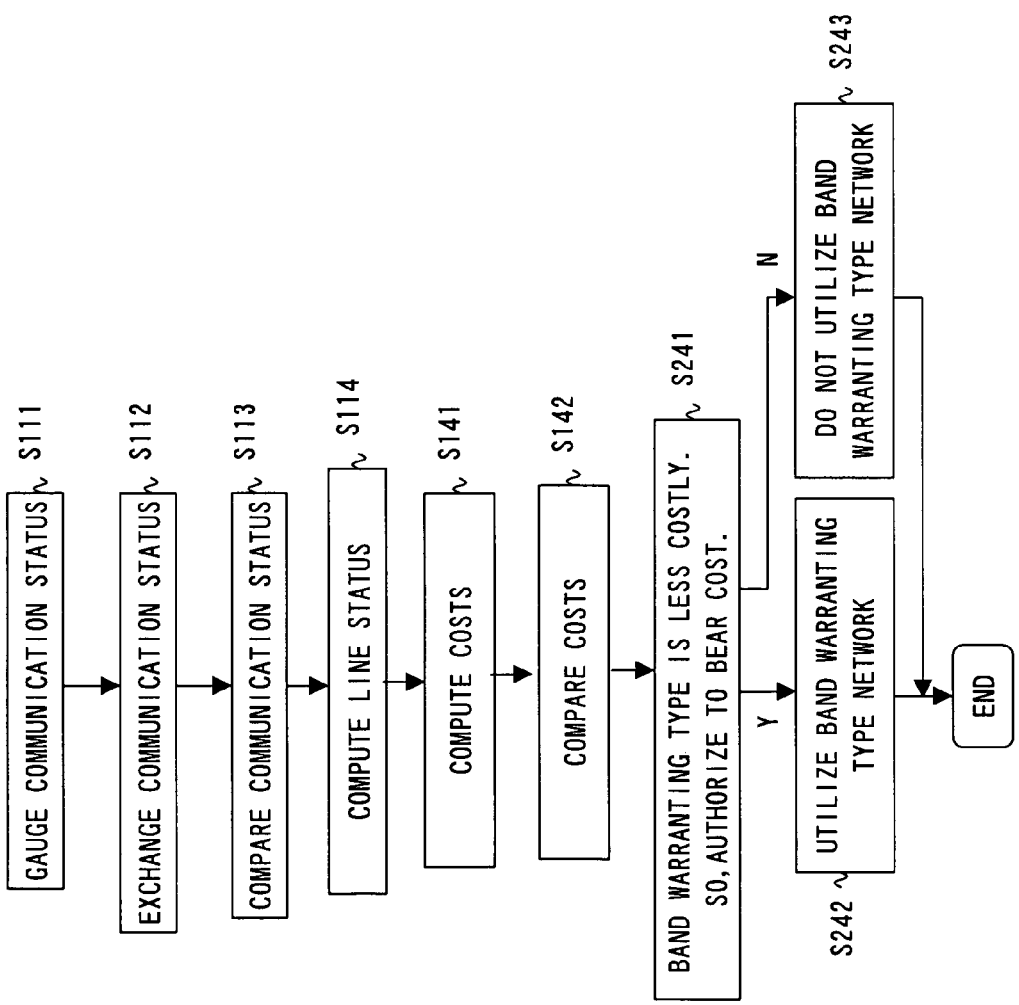

BAND CONTROL APPARATUS, BAND CONTROL PROGRAM AND BAND CONTROL METHOD

BACKGROUND OF THE INVENTION

1. Field of the Invention

This invention relates to a band control apparatus band control program, and band control method for controlling the bands of a plurality of lines.

2. Description of the Related Art

Link load distribution apparatus for distributing a load by utilizing a plurality of lines are known.

Transmission band control apparatus for retrieving routes that can meet a flow transfer request from a user terminal and executing a load distribution process to define a router are known as prior art relating to the present invention (see, inter alia, Jpn. Pat. Appln. Laid-Open Publication No. 2004-236198).

However, when a band not-warranting type network that does not warrant a band is utilized for telecommunications and other businesses, a necessary band may not be secured to adversely affect the telecommunications and the other businesses. On the other hand, a band warranting type network that warrants a band is costly particularly in terms of maintenance to discourage installation and make it difficult to find a necessary band for the user.

SUMMARY OF THE INVENTION

In view of the above identified problems, it is therefore the object of the present invention to provide a band control apparatus, a band control program and a band control method that control bands, taking the cost into consideration.

In an aspect of the present invention, the above object of the invention is achieved by providing a band control apparatus for relaying signals by using at least one of a plurality of lines, the band control apparatus being connected to some band control apparatus by way of the plurality of lines and adapted to cooperate with the other band control apparatus to control the bands of the plurality of lines, the apparatus comprising: a communication status gauging section that gauges the communication status of the own apparatus on the plurality of lines as first communication status; a communication status acquisition section that acquires the communication status of the other band control apparatus on the plurality of lines as second communication status; and a band control section that computationally determines the line status of each of the lines according to the first communication status acquired by the communication status gauging section and the second communication status acquired by the communication status acquiring section and allocates the bands to be used for the relay to the plurality of lines according to the line statuses.

In a band control apparatus according to the invention, the band control section additionally acquires the line fluctuations information recorded as fluctuations of the line statuses relative to clock time and allocates the bands according to the line status and the line fluctuations information.

In a band control apparatus according to the invention, the band control section compares the line statuses and the line fluctuations information and, if the fluctuations of the line statuses resemble the line fluctuations information, predicts the line statuses by the line fluctuations information and allocates the bands according to the outcome of the prediction.

In a band control apparatus according to the invention, the band control section compares the line statuses and the line fluctuations information and, if the fluctuations of the line statuses do not resemble the line fluctuations information, updates the line fluctuations information according to the line statuses.

In a band control apparatus according to the invention, the band control section additionally acquires the predetermined line cost information for each of the lines and the upper limit cost that is the upper limit of the predefined bearable cost and allocates the bands according to the line cost information, the upper limit cost and the line statuses.

In a band control apparatus according to the invention, the band control section additionally acquires the band required for each application and the reduced cost to be achieved by the application, the band required for each application and the reduced cost to be achieved by the application being predefined, and allocates the band according to the line cost information, the upper limit cost, the required band, the reduced cost and the line statuses.

In a band control apparatus according to the invention, the communication status acquisition section additionally transmits the first communication status gauged by the communication status gauging section to the other band control apparatus.

In a band control apparatus according to the invention, the line status includes the bandwidth being used of each of the lines and the band control section allocates the bands so as to secure the predefined required bandwidths.

In another aspect of the present invention, there is provided a band control program that causes the computer of a band control apparatus for relaying signals by using at least one of a plurality of lines to execute it, the band control apparatus being connected to some band control apparatus by way of the plurality of lines, the band control program being adapted to cooperate with the other band control apparatus to control the bands of the plurality of lines, the program comprising: a communication status gauging step that gauges the communication status of the own apparatus on the plurality of lines as first communication status; a communication status acquisition step that acquires the communication status of the other band control apparatus on the plurality of lines as second communication status; and a band control step that computationally determines the line status of each of the lines according to the first communication status acquired by the communication status gauging step and the second communication status acquired by the communication status acquiring step and allocates the bands to be used for the relay to the plurality of lines according to the line statuses.

In still another aspect of the present invention, there is provided a band control method for controlling the bands of a plurality of lines by means of a band control apparatus for relaying signals by using at least one of a plurality of lines, the band control apparatus being connected to some band control apparatus by way of the plurality of lines, the band control method being adapted to cooperate with the other band control apparatus to control the bands of the plurality of lines, the method comprising: a communication status gauging step that gauges the communication status of the own apparatus on the plurality of lines as first communication status; a communication status acquisition step that acquires the communication status of the other band control apparatus on the plurality of lines as second communication status; and a band control step that computationally determines the line status of each of the lines according to the first communication status acquired by the communication status gauging step and the second communication status acquired by the communication status acquiring step and allocates the bands to be used for the relay to the plurality of lines according to the line statuses.

Thus, as described above, according to the present invention, it is possible to utilize a plurality of lines at reasonable cost by monitoring the status of each line and using a band warranting type network only when it is judged that the use of a band warranting type network is necessary on the basis of the outcome of the monitoring.

BRIEF DESCRIPTION OF THE DRAWINGS

FIG. 4 is a table illustrating the exemplar contents of the line fluctuations information DB of the second embodiment;

FIG. 9 is a table illustrating the exemplar contents of the application cost DB of the fourth embodiment; and FIG. 10 is a flowchart of an example of the operation of the fourth embodiment of band control apparatus.

DETAILED DESCRIPTION OF THE PREFERRED EMBODIMENTS

Now, the present invention will be described in greater detail by referring to the accompanying drawings that illustrate preferred embodiments of the invention.

First Embodiment

Firstly, the configuration of this embodiment of band control apparatus will be described below.

Figure 1:
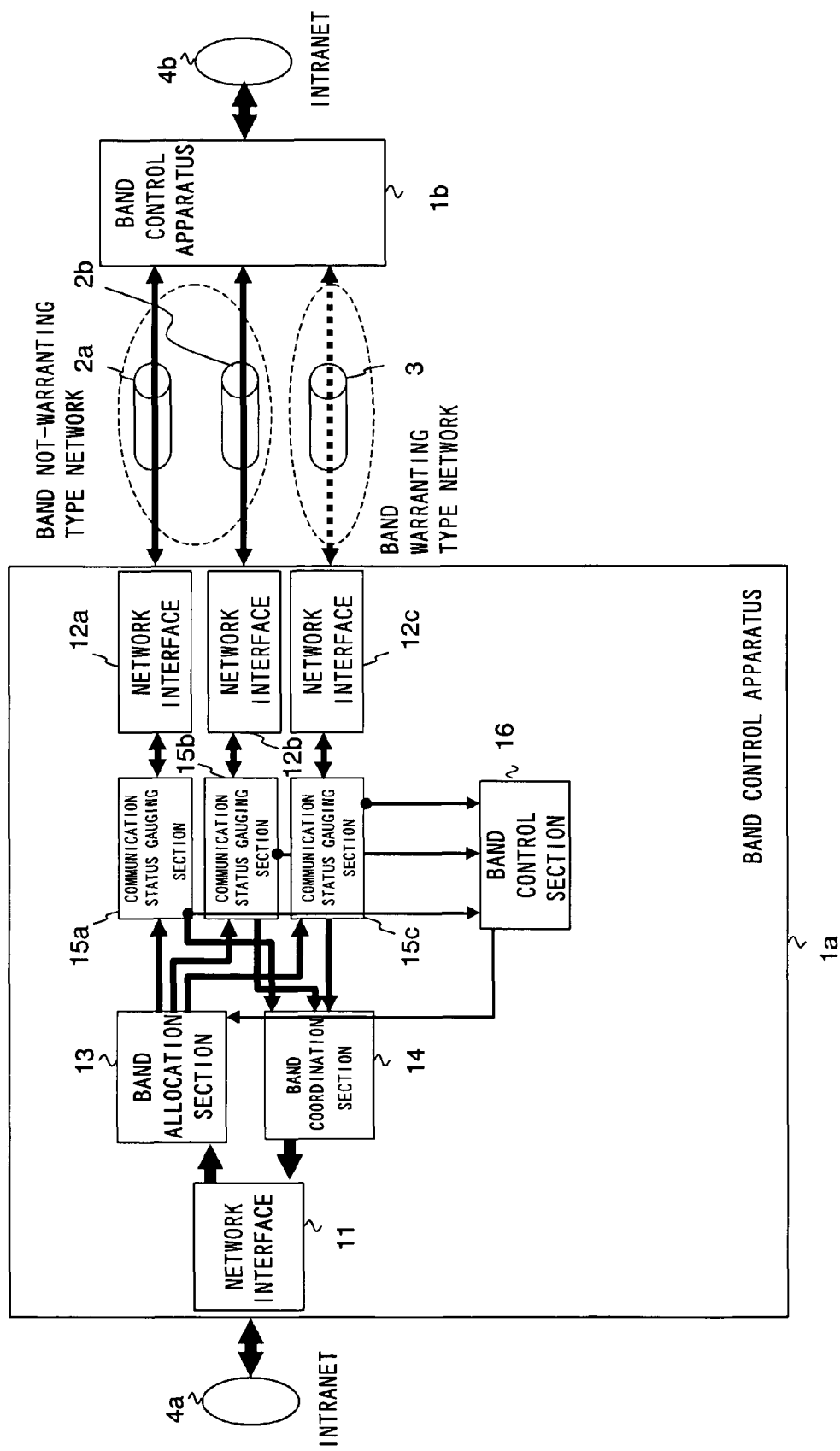
FIG. 1 is a schematic block diagram of the first embodiment of band control apparatus according to the present invention, showing the configuration thereof.

FIG. 1 is a schematic block diagram of this embodiment of band control apparatus according to the present invention, showing the configuration thereof. Referring to FIG. 1, the embodiment is adapted to connect two intranets 4a, 4b. The intranet 4a is connected to band not-warranting type networks (lines) 2a, 2b and a band warranting type network (line) 3 by way of a band control apparatus 1a. Additionally, the band not-warranting type networks 2a, 2b and the band warranting type network 3 are connected to the intranet 4b by way of another band control apparatus 1b. The band control apparatus 1a and the band control apparatus 1b have a same configuration and each of them comprises a network interface 11, network interfaces 12a, 12b, 12c, a band allocation section 13, band coordination section 14, communication status gauging sections 15a, 15b, 15c and a band control section 16.

The band not-warranting type networks 2a, 2b are less costly flat rate lines, whereas the band warranting type network 3 is an expensive metered rate line.

Now, the operation of the embodiment of band control apparatus will be described below.

The network interfaces 12a, 12b, 12c transmit respectively the data respectively from the band not-warranting type networks 2a, 2b and the band warranting type network 3 to the communication status gauging sections 15a, 15b, 15c that are connected to them. The communication status gauging sections 15a, 15b, 15c respectively transmit the data received from the network interfaces 12a, 12b, 12c to the band coordination section 14 and also deliver the results of monitoring the data to the band control section 16 as communication status information. The band coordination section 14 coordinates the data received from the band not-warranting type networks 2a, 2b and the band warranting type network 3 by way of the network interfaces 12a, 12b, 12c and the communication status gauging sections 15a, 15b, 15c and transmits the coordinated data to the network interface 11. The network interface 11 transmits the data it receives from the band coordination section 14 to the intranet 4a.

The band control section 16 additionally determines the band of each of the lines by executing a band control process according to the line status of line and delivers the band allocation ratios obtained as a result of the band control process to the band allocation section 13. The network interface 11 transmits the data it receives from the intranet 4a to the band allocation section 13. The band allocation section 13 transmits the data it receives from the network interface 11, allocating them to the band not-warranting type networks 2a, 2b and the band warranting type network 3 (by way of the communication status gauging sections 15a, 15b, 15c) according to the band allocation ratios. The communication status gauging sections 15a, 15b, 15c respectively transmit the data they receive from the band allocation section 13 to the network interfaces 12a, 12b, 12c and also deliver the results of monitoring the data to the band control section 16 as communication status information. The network interfaces 12a, 12b, 12c respectively transmit the data they receive from the communication status gauging sections 15a, 15b, 15c to the band not-warranting type networks 2a, 2b and the band warranting type network 3.

Additionally, the band control section 16 of the band control apparatus 1a is connected to the band control section 16 of the band control apparatus 1b by way of the band not-warranting type networks 2a, 2b and the band warranting type network 3 (and also respectively by way of the network interface 12a and the communication status gauging section 15a, the network interface 12b and the communication status gauging section 15b and the network interface 12c and the communication status gauging section 15c) and exchanges the communication statuses it gauges with the band control section 16 of the band control apparatus 1b.

Now, the band control process that the band control section 16 of this embodiment executes will be described below.

Figure 2:
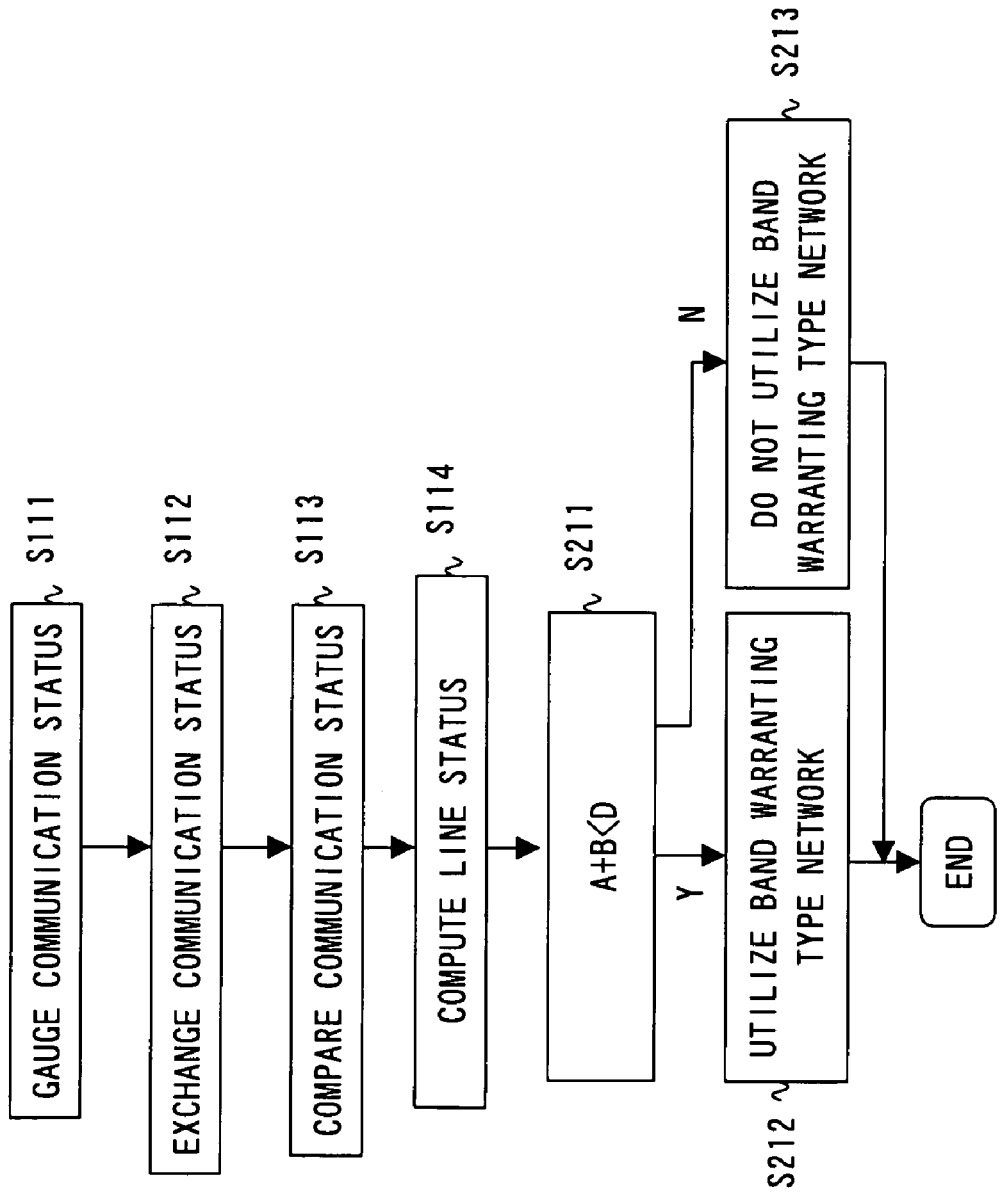
FIG. 2 is a flowchart of an example of the operation of the first embodiment of band control apparatus.

FIG. 2 is a flowchart of the band control process of the first embodiment of band control apparatus. Referring to FIG. 2, firstly the band control section 16 gauges the bands by means of which data are actually transmitted/received as obtained from the communication status gauging sections 15a, 15b, 15c (bandwidth or the number of packets or the amount of data that passed through each of them) and the title of the application as communication statuses (S111). Then, the band control section 16 exchanges the communication statuses with the band control section 16 of the band control apparatus 1b (S112), compares the bands at the side of the intranet 4a and the communication statuses gauged by the band control apparatus 1a and the communication statuses gauged by the band control apparatus 1b (S113) and computationally determines the status of each of the lines according to the results of the comparison and the bands at the side of the intranet 4a (S114).

The line status includes the band of each of the lines, the packet loss (the quantity of lost data) of each of the lines and the delay time of each of the lines. Of these, the band is gauged by the corresponding one of the communication status gauging section 15a, 15b or 15c. The values of the bands of the line status of the band not-warranting type networks 2a, 2b and the value of the band of the line status of the band warranting type network 3 (the values of the bands as gauged respectively by the communication status gauging sections 15a, 15b, 15c) are respectively referred to as A, B and C hereinafter. The packet loss of each of the lines is determined by comparing the number of packets that the band control apparatus 1b transmitted to the line and the number of packets that the band control apparatus 1b received from the line. The delay time is gauged typically by sending ping to the band control apparatus 1b in the processing step S112.

Then, provided that the predefined required band is D, the band control section 16 determines if the requirement of "A+B<D" (for securing the required band only by using the band not-warranting type networks 2a, 2b) is met or not (S211). If the requirement is met (S211, Y), the band control section 16 decides to use the band warranting type network 3 and delivers the allocation ratios for using the band not-warranting type networks 2a, 2b and the band warranting type network 3 (the predefined value of a band for each of the lines) to the band allocation section 13 (S212) to end the flow of operation. If, on the other hand, the requirement is not met (S211, N), the band control section 16 decides not to use the band warranting type network 3 and delivers the allocation ratios for using only the band not-warranting type networks 2a, 2b to the band allocation section 13 (S213) to end the flow of operation. Thereafter, the band control section 16 repeats the above-described flow of operation.

It may be alternatively so arranged that the upper limit is predefined for delay time and the band control section 16 adds the requirement that the delay time does not exceed the upper limit for the line status to the processing step S211 and decides if it utilizes the band warranting type network 3 or not by determining if the requirements of the processing step S211 are met or not. Furthermore, it may be alternatively be so arranged that the upper limit is predefined for packet loss and the band control section 16 adds the requirement that the packet loss does not exceed the upper limit for the line status to the processing step S211 and decides if it utilizes the band warranting type network 3 or not by determining if the requirements of the processing step S211 are met or not.

Thus, with this embodiment of the invention, it is possible to utilize a plurality of lines at reasonable cost by monitoring the status of each line and using a band warranting type network only when it is judged that the use of a band warranting type network is necessary on the basis of the outcome of the monitoring.

Second Embodiment

Firstly, the configuration of this embodiment of band control apparatus will be described below.

Figure 3:
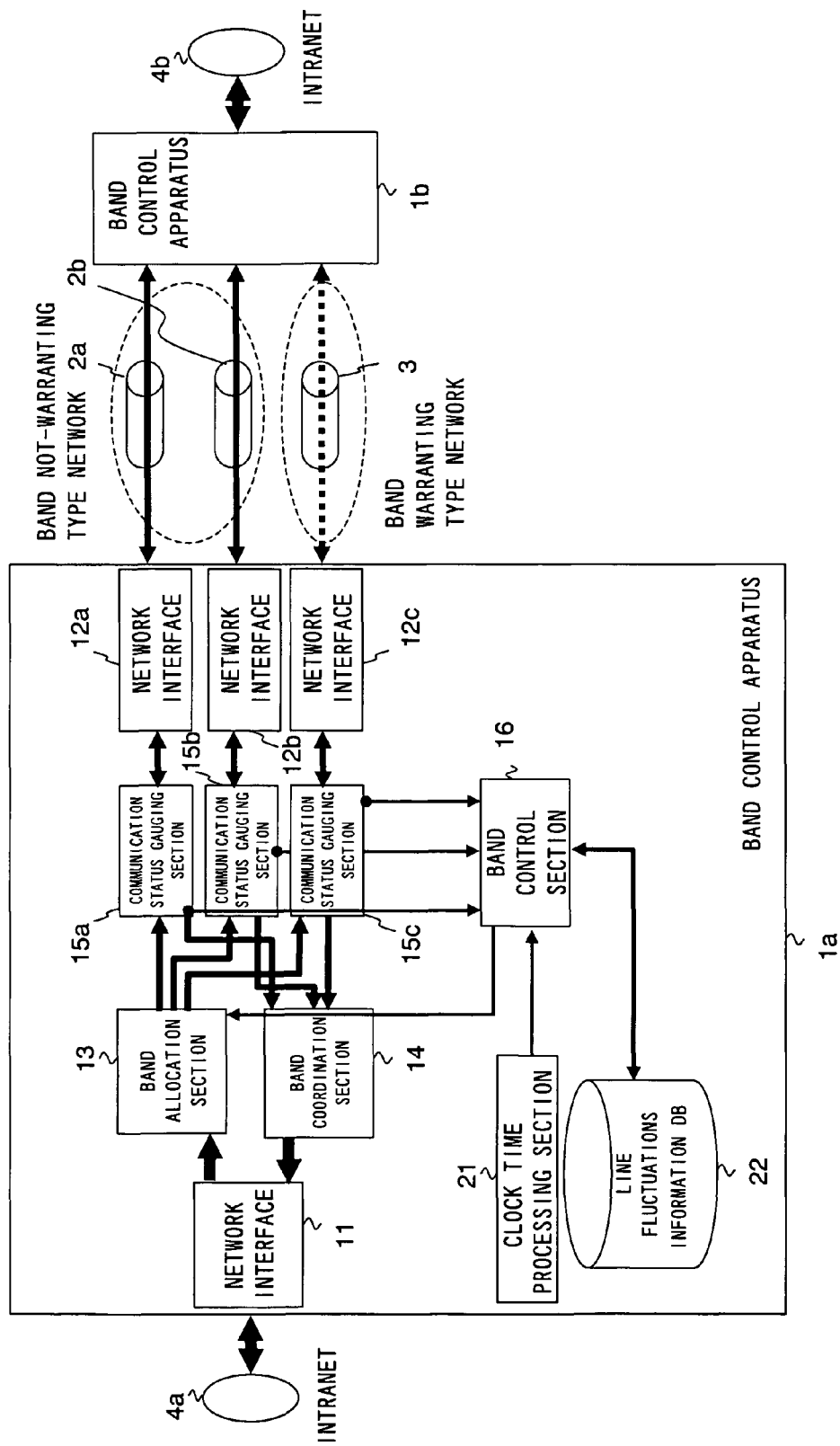
FIG. 3 is a schematic block diagram of the second embodiment of band control apparatus according to the present invention, showing the configuration thereof.

FIG. 3 is a schematic block diagram of this embodiment of band control apparatus according to the present invention, showing the configuration thereof. In FIG. 3, the objects same as those or corresponding to those illustrated in FIG. 1 are denoted respectively by the same reference symbols and will not be described any further. This embodiment additionally comprises a clock time processing section 21 and a line fluctuations information DB (data base) 22.

The clock time processing section 21 delivers the clock time including the date, the day of the week and the time zone in every unit time to the band control section 16. The band control section 16 stores line fluctuations information obtained by establishing correspondence between the clock time in every predetermined unit time and the line statuses in every predetermined unit time in line fluctuations information DB 22.

FIG. 4 is a table illustrating the exemplar contents of the line fluctuations information DB of the second embodiment. In this example, the line fluctuations information DB 22 holds a record of every hour. The record includes the average bands [Mbps] of the hour as gauged by the communication status gauging sections 15a, 15b and 15c. In this example, the required band D=20 Mbps. In this example, A+B≧D from the 0 o'clock time zone to the 4 o'clock time zone on Monday so that only the band not-warranting type networks 2a, 2b will be used in these time zones but A+B<D in the 5 o'clock time zone so that all of the band not-warranting type networks 2a, 2b and the band warranting type network 3 will used in this time zone. While the table of FIG. 4 shows only the line fluctuations information from the 0 o'clock time zone to the 23 o'clock time zone, the line fluctuations information of the other days of the week are also recorded in the form of similar tables in the line fluctuations information DB 22.

While the line fluctuations information DB 22 stores information for every day of the week in the above described example, it may alternatively be so arranged that the line fluctuations information DB 22 stores information for every month of the year, for every day of the month, for every year or a combination of any of them.

Now, the band control process that the band control section 16 of this embodiment executes will be described below.

Figure 5:
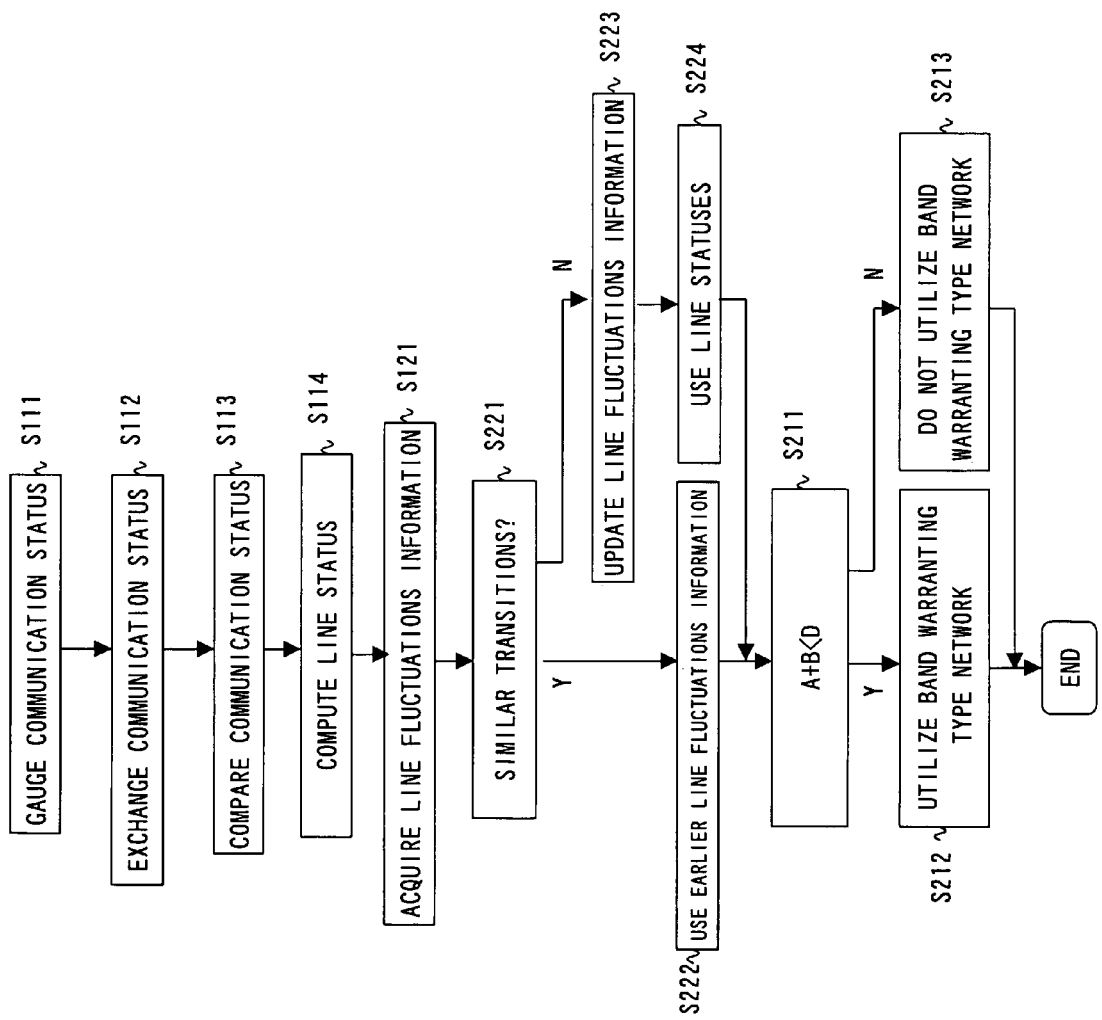
FIG. 5 is a flowchart of an example of the operation of the second embodiment of band control apparatus.

FIG. 5 is a flowchart of the band control process of this embodiment of band control apparatus. In FIG. 5, the processing steps denoted by the step numbers same as those of FIG. 2 are same as those of FIG. 2 and will not be described here any further. Firstly, the band control section 16 executes the processing steps of S111 through S114 as in the first embodiment.

Then, the band control section 16 acquires the line fluctuations information that corresponds to the current clock time and a time zone near the current clock time from the line fluctuations information DB 22 (S121) and compares the changes with time of the bands in the acquired line fluctuations information and the changes with time of the bands in the acquired line statuses and judges if the transitions of the two bands are similar to each other or not (if the fluctuations of the two bands resemble each other or not) (S221). If the transitions of the two bands are similar to each other (S221, Y), the band control section 16 uses the acquired line fluctuations information as presumed line statuses (uses the line fluctuations information at timing earlier than the line statuses) (S222) and executes the processing steps S211 through S213 that are same as those of the first embodiment to end the flow of operation. If, on the other hand, the transitions of the two bands are not similar to each other (S221, N), the band control section 16 establishes correspondence between the data obtained by statistically processing the acquired line statuses over a unit time (averaging them over a unit time) and the current clock time and updates the line fluctuations information (S223) before it executes the processing steps S211 through S213, using the acquired line statuses (S224), and ends the flow of operation. Thereafter, the band control section 16 repeats the above-described flow of operation.

It may be alternatively so arranged that the line fluctuations information includes the delay time of each of the bands and the band control section 16 predicts the fluctuations of the delay time like the fluctuations of each of the bands and controls the bands according to the results of the prediction. Furthermore, it may be alternatively so arranged that the line fluctuations information includes the packet loss of each of the bands and the band control section 16 predicts the fluctuations of the packet loss like the fluctuations of each of the bands and controls the bands according to the results of the prediction.

Thus, with this embodiment, it is possible for the band control section 16 to prevent delay of band control by accumulating line fluctuations information, predicting the fluctuations of each of the bands by using the line fluctuations information of the time zone that corresponds to the current clock time and precautionarily controlling the bands.

Third Embodiment

Firstly, the configuration of this embodiment of band control apparatus will be described below.

Figure 6:
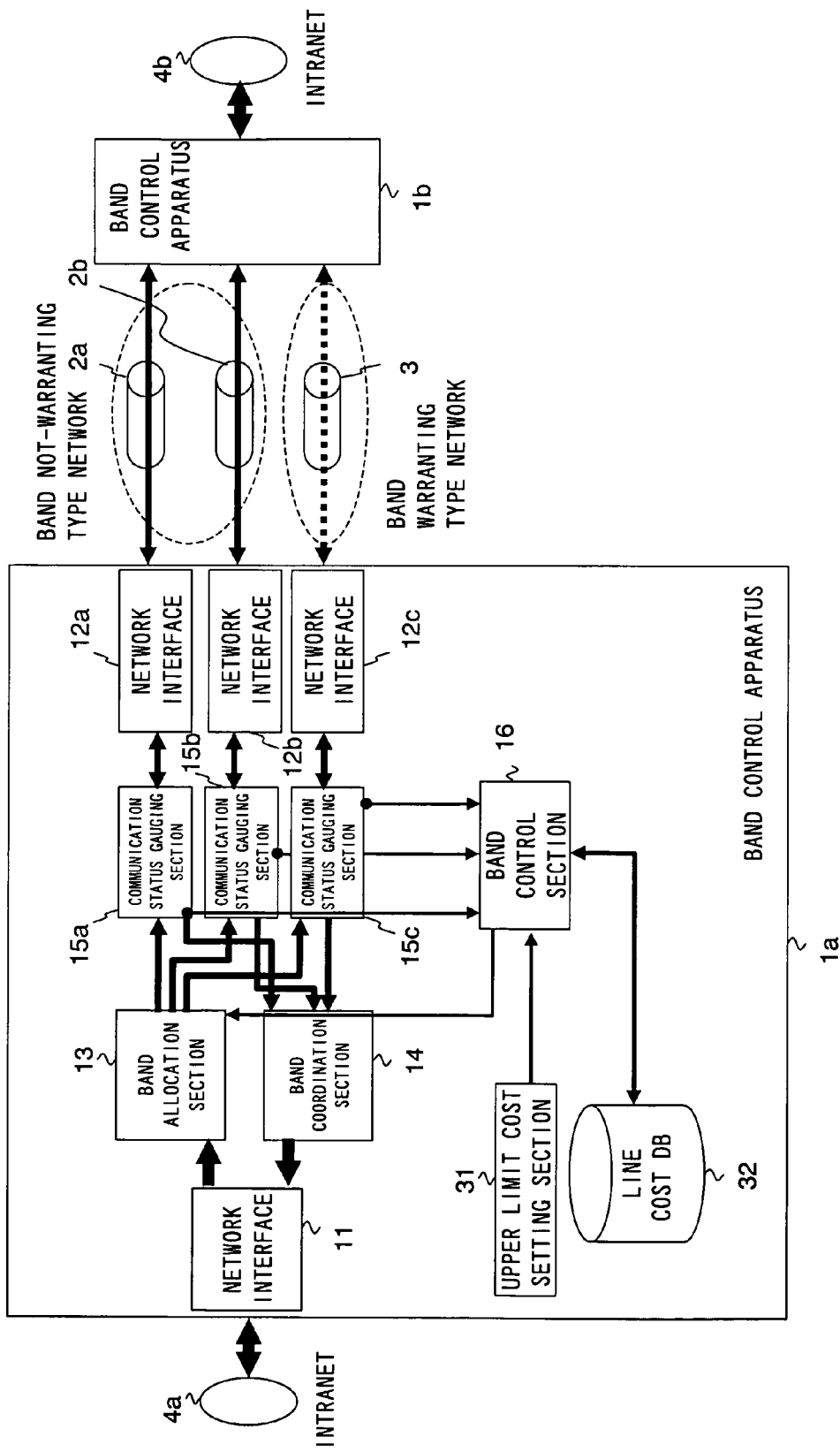
FIG. 6 is a schematic block diagram of the third embodiment of band control apparatus according to the present invention, showing the configuration thereof.

FIG. 6 is a schematic block diagram of this embodiment of band control apparatus according to the present invention, showing the configuration thereof. In FIG. 6, the objects same as those or corresponding to those illustrated in FIG. 1 are denoted respectively by the same reference symbols and will not be described any further. This embodiment additionally comprises an upper limit cost setting section 31 and a line cost DB 32.

The upper limit cost setting section 31 stores the upper limit cost (the upper limit of bearable cost) in advance. The line cost DB 32 stores line cost information of each of the lines in advance. The line cost information shows the line cost that rises as each of the lines is used.

Now, the band control process that the band control section 16 of this embodiment executes will be described below.

Figure 7:
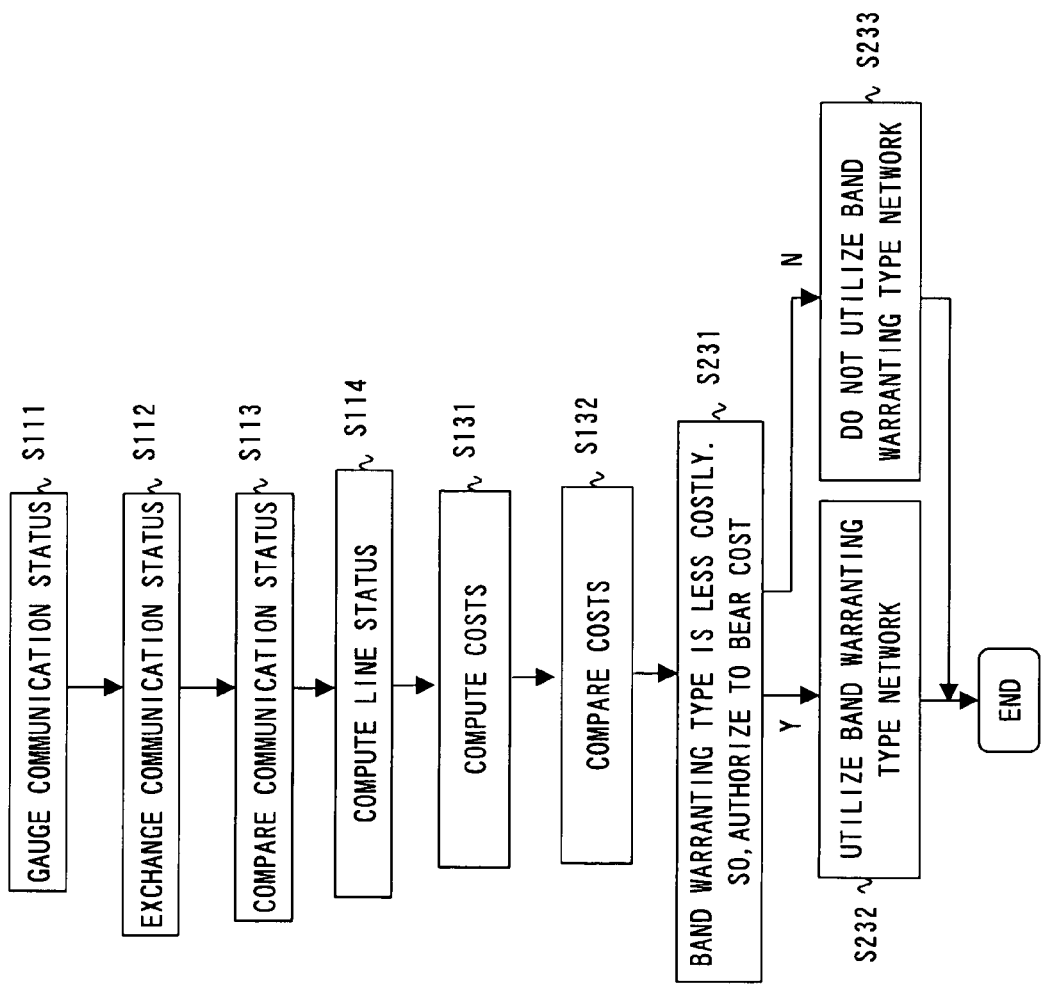
FIG. 7 is a flowchart of an example of the operation of the third embodiment of band control apparatus.

FIG. 7 is a flowchart of the band control process of this embodiment of band control apparatus. In FIG. 7, the processing steps denoted by the step numbers same as those of FIG. 2 are same as those of FIG. 2 and will not be described here any further. Firstly, the band control section 16 executes the processing steps of S111 through S114 as in the first embodiment. Then, the band control section 16 acquires the line cost information stored in the line cost DB 32 and computes the cost of a case where the band warranting type network 3 is used and the cost of the case where the band warranting type network 3 is not used (S131) based on the acquired line status and line cost information. The cost of each of the two cases is computed by adding the line costs of the lines to be used.

Then, the band control section 16 compares the costs of the two cases (S132) and determines if the requirement that "the cost of the case of using the band warranting type network 3 is lower in the above two cases and hence the band control section 16 can be authorized to bear the cost (the cost does not exceed the upper limit cost stored in the upper limit cost setting section 31)" is met or not (S231).

If the requirement is met (S231, Y), the band control section 16 decides to use the band warranting type network 3 and delivers the band allocation ratios for using the band not-warranting type networks 2*a*, 2*b* and the band warranting type network 3 to the band allocation section 13 (S232) to end the flow of operation. If, on the other hand, the requirement is not met (S231, N), the band control section 16 decides not to use the band warranting type network 3 and delivers the band allocation ratios for using only the band not-warranting type networks 2*a*, 2*b* to the band allocation section 13 (S233) to end the flow of operation. Thereafter, the band control section repeats the above-described flow of operation.

It may be alternatively so arranged that the upper limit is predefined for delay time and the band control section 16 adds the requirement that the delay time does not exceed the upper limit for the line status to the processing step S231 and decides if it utilizes the band warranting network 3 or not by determining if the requirements of the processing step S231 are met or not. Furthermore, it may be alternatively so arranged that the upper limit is predefined for packet loss and the band control section 16 adds the requirement that the packet loss does not exceed the upper limit for the line status to the processing step S231 and decides if it utilizes the band warranting type network 3 or not by determining if the requirements of the processing step S231 are met or not.

Thus, with this embodiment of the invention, it is possible to allocate the lines by taking the cost into consideration.

Fourth Embodiment

Firstly, the configuration of this embodiment of band control apparatus will be described below.

Figure 8:
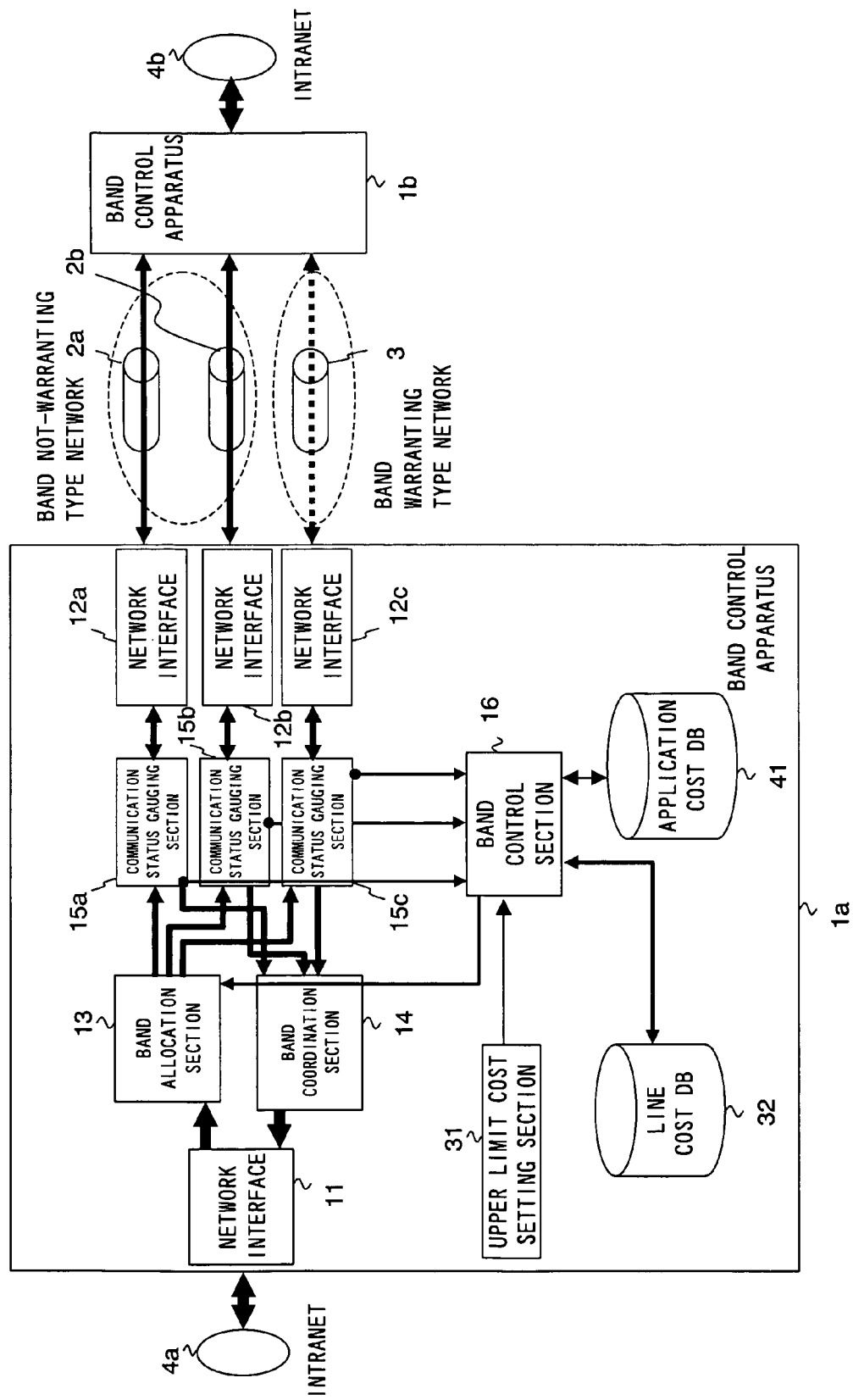
FIG. 8 is a schematic block diagram of the fourth embodiment of band control apparatus according to the present invention, showing the configuration thereof.

FIG. 8 is a schematic block diagram of this embodiment of band control apparatus according to the present invention, showing the configuration thereof. In FIG. 8, the objects same as those or corresponding to those illustrated in FIG. 6 are denoted respectively by the same reference symbols and will not be described any further. This embodiment additionally comprises an application cost DB 41.

The application cost DB 41 stores information on the predefined applications and the cost of the applications. FIG. 9 is a table illustrating the exemplar contents of the application cost DB of this embodiment. The application cost DB 41 stores the application information predefined for each of the applications. Each piece of application information includes items of the title of the application, the required band, the cost effectiveness and the overtime meter use.

The titles of the applications of the illustrated example include VoIP (Voice over Internet Protocol), TV conference, Web, Mail and DB. The required band is the band that needs to be securely provided. The cost effectiveness is the cost that can be reduced by using the corresponding application. In other words, it is the cost that is incurred by the business when the application is not used. For example, when a TV conference is not used, the persons who attend a conference have to move to spend business expenses including travel expenses and travel time that is reflected to the labor cost, which business expenses is expressed as the cost effectiveness of the TV conference. The overtime meter use is a technique of using the band warranting type network 3 when the upper limit cost is exceeded. "Continuation" (the requirements of the required band have priority and the cost is disregarded) or "discontinuation" (the use of the application is limited and priority is given to the upper limit cost) are defined.

Now, the band control process that the band control section 16 of this embodiment executes will be described below.

FIG. 10 is a flowchart of the band control process of this embodiment of band control apparatus. In FIG. 10, the processing steps denoted by the step numbers same as those of FIG. 2 are same as those of FIG. 2 and will not be described here any further. Firstly, the band control section 16 executes the processing steps of S111 through S114 as in the first embodiment. Then, the band control section 16 acquires the title of the application that is being used form the line statuses along with the application information that corresponds to the title of the application that is being used from the application information stored in the application cost DB 41 and the line cost information stored in the line cost DB 32. Subsequently, the band control section 16 computationally determines the cost of the case where the band warranting type network 3 is used and the cost of the case where the band warranting type network 3 is not used according to the line statuses, the application information and the line cost information it has acquired (S141). The cost of each of the cases is computationally determined by totaling the sum of the additional cost of using the line according to the line cost information and the reduced cost due to the cost effectiveness according to the application information.

Then, the band control section 16 compares costs of the two cases (S142) and determines if the requirement that "the cost of the case of using the band warranting type network 3 is lower in the above two cases and hence the band control section 16 can be authorized to bear the cost (the cost does not exceed the upper limit cost stored in the upper limit cost setting section 31)" is met or not (S241). The band control section 16 can be authorized to bear the cost when the cost does not exceed the upper limit cost stored in the upper limit cost setting section 31 as in the third embodiment but the band control section 16 is authorized to bear the cost if the computationally determined cost exceeds the upper limit cost when the value of the overtime meter use in the application information of the application to be used indicates "continuation", whereas the band control section 16 is not authorized to bear the cost if the computationally determined cost exceeds the upper limit cost when the value of the overtime meter use in the application information of the application to be used indicates "discontinuation".

When the requirement is met (S241, Y), the band control section 16 decides to use the band warranting type network 3 and delivers the band allocation ratios for using the band not-warranting type networks 2a, 2b and the band warranting type network 3 to the band allocation section 13 (S242) to end the flow of operation. When the requirement is not met (S241, N), the band control section 16 decides not to use the band warranting type network 3 and delivers the band allocation ratios for using only the band not-warranting type networks 2a, 2b to the band allocation section 13 (S243) to end the flow of operation. Thereafter, the band control section 16 repeats the above-described flow of operation.

It may be alternatively so arranged that the upper limit is predefined for delay time in the application cost DB 41 and the band control section 16 adds the requirement that the delay time does not exceed the upper limit for the line status to the processing step S241 and decides if it utilizes the band warranting type network 3 or not by determining if the requirements of the processing step S241 are met or not. Furthermore, it may be alternatively be so arranged that the upper limit is predefined for packet loss in the application cost DB 41 and the band control section 16 adds the requirement that the packet loss does not exceed the upper limit for the line status to the processing step S241 and decides if it utilizes the band warranting type network 3 or not by determining if the requirements of the processing step S241 are met or not.

Thus, with this embodiment, it is possible to control the bands in a manner that matches the cost of each of the applications by defining the required bands, the cost effectiveness and the use or non-use of the overtime meter use for each of the applications.

Additionally, this embodiment of band control apparatus can be applied to a network relay apparatus with ease to improve the performance of the network relay apparatus. For the purpose of the present invention, network relay apparatus include routers, proxy servers and load distribution apparatus.

The present invention also provides a program for causing the computer of a band control apparatus to execute the above-described processing steps as band control program. It is possible to have the computer of a band control apparatus execute such a program by recording it in a computer readable recording medium. Examples of computer readable recording mediums that can be used for the purpose of the present invention include internal storage apparatus such as ROMs and RAMs that are mounted in computers, portable storage mediums such as CD-ROMs, flexible disks, DVD disks, magneto-optical disks and IC cards, databases holding computer programs, external computers, databases of such external computers and transmission mediums on telecommunication lines.

Note that in a band control apparatus according to the present invention, the communication status acquisition section corresponds to the band control section of each of the above described embodiments and the band control section corresponds to the band control section and the band allocation section of each of the above described embodiments. Also note that in a band control program and a band control method according to the present invention, the communication status gauging step corresponds to the processing step S111 of each of the applicable embodiments and also the communication status acquisition step corresponds to the processing step S112 of each of the applicable embodiments, while the band control step corresponds to the processing step S113 and the applicable subsequent processing steps of each of the applicable embodiments.

What is claimed is:

1. A band control apparatus for relaying signals by using at least one of a plurality of lines, the band control apparatus being connected to some band control apparatus by way of the plurality of lines and adapted to cooperate with the other band control apparatus to control the bands of the plurality of lines which include a first line and second lines, the apparatus comprising:
   a communication status gauging section that gauges the communication status of the own apparatus on the plurality of lines as first communication status;
   a communication status acquisition section that acquires the communication status of the other band control apparatus on the plurality of lines as second communication status; and
   a band control section that computationally determines the line status of each of the lines according to the first communication status acquired by the communication status gauging section and the second communication status acquired by the communication status acquiring section and allocates the bands to be used for the relay to the plurality of lines according to the line statuses such that the first line and the second lines are used when a value of a band required for relaying signals exceeds the sum of values of the bands of the line status of the second lines and that only the second lines are used otherwise.

2. The apparatus according to claim 1, wherein
   the band control section additionally acquires the line fluctuations information recorded as fluctuations of the line statuses relative to clock time and allocates the bands according to the line status and the line fluctuations information.

3. The apparatus according to claim 2, wherein
   the band control section compares the line statuses and the line fluctuations information and, if the fluctuations of the line statuses resemble the line fluctuations information, predicts the line statuses by the line fluctuations information and allocates the bands according to the outcome of the prediction.

4. The apparatus according to claim 3, wherein the band control section compares the line statuses and the line fluctuations information and, if the fluctuations of the line statuses do not resemble the line fluctuations information, updates the line fluctuations information according to the line statuses.

5. The apparatus according to claim 1, wherein the band control section additionally acquires the predetermined line cost information for each of the lines and the upper limit cost that is the upper limit of the predefined bearable cost and allocates the bands according to the line cost information, the upper limit cost and the line statuses.

6. The apparatus according to claim 5, wherein the band control section additionally acquires the band required for each application and the reduced cost to be achieved by the application, the band required for each application and the reduced cost to be achieved by the application being predefined, and allocates the band according to the line cost information, the upper limit cost, the required band, the reduced cost and the line statuses.

7. The apparatus according to claim 1, wherein the communication status acquisition section additionally transmits the first communication status gauged by the communication status gauging section to the other band control apparatus.

8. The apparatus according to claim 1, wherein the line status includes the bandwidth being used of each of the lines and the band control section allocates the bands so as to secure the predefined required bandwidths.

9. The apparatus according to claim 8, wherein the band control section additionally computationally determines the quantity of the lost data of each of the lines according to the first line status and the second line status, includes the quantity of the lost data in the line statuses and allocates the bands so that the quantity of the lost data may not exceed the value of the allowable quantity of lost data predefined for each application.

10. The apparatus according to claim 8, wherein the band control section additionally gauges the delay time of each of the lines between the other band control apparatus, includes it in the line status and allocates the bands so that the quantity of the delay time does not exceed the value of the allowable delay time predefined for each application.

11. A non-transitory computer readable medium that contains band control program that causes the computer of a band control apparatus for relaying signals by using at least one of a plurality of lines to execute it, the band control apparatus being connected to some band control apparatus by way of the plurality of lines, the band control program being adapted to cooperate with the other band control apparatus to control the bands of the plurality of lines which include a first line and second lines, the program causing the computer to perform:
a communication status gauging step that gauges the communication status of the own apparatus on the plurality of lines as first communication status;
a communication status acquisition step that acquires the communication status of the other band control apparatus on the plurality of lines as second communication status; and
a band control step that computationally determines the line status of each of the lines according to the first communication status acquired by the communication status gauging step and the second communication status acquired by the communication status acquiring step and allocates the bands to be used for the relay to the plurality of lines according to the line statuses such that the first line and the second lines are used when a value of a band required for relaying signals exceeds the sum of values of the bands of the line status of the second lines and that only the second lines are used otherwise.

12. The non-transitory computer readable medium according to claim 11, wherein the program further causes the computer to:
acquire the line fluctuations information recorded as fluctuations of the line statuses relative to clock time; and
allocate the bands according to the line statuses and the line fluctuations information.

13. The non-transitory computer readable medium according to claim 12, wherein the program further causes the computer to:
compare the line status and the line fluctuations information;
predict the line statuses by the line fluctuations information if the fluctuations of the line statuses resemble the line fluctuations information; and
allocate the bands according to the outcome of the prediction.

14. The non-transitory computer readable medium according to claim 13, wherein the program further causes the computer to:
compare the line statuses and the line fluctuations information;
if the fluctuations of the line statuses do not resemble the line fluctuations information, update the line fluctuations information according to the line statuses.

15. The non-transitory computer readable medium according to claim 11, wherein the program further causes the computer to:
acquire the predetermined line cost information for each of the lines and the upper limit cost that is the upper limit of the predefined bearable cost; and
allocate the bands according to the line cost information, the upper limit cost and the line statuses.

16. The non-transitory computer readable medium according to claim 15, wherein the program further causes the computer to:
acquire the band required for each application and the reduced cost to be achieved by the application, the band required for each application and the reduced cost to be achieved by the application being predefined; and
allocate the band according to the line cost information, the upper limit cost, the required band, the reduced cost and the line statuses.

17. The non-transitory computer readable medium according to claim 11, wherein
the program further causes the computer to transmit the first communication status gauged by the communication status gauging step to the other band control apparatus.

18. The non-transitory computer readable medium according to claim 11, wherein
the line status includes the bandwidth being used of each of the lines, and
the program further causes the computer to allocate the bands so as to secure the predefined required bandwidths.

19. The non-transitory computer readable medium according to claim 18, wherein the program further causes the computer to:

computationally determine the quantity of the lost data of each of the lines according to the first line status and the second line status, includes the quantity of the lost data in the line statuses; and allocate the bands so that the quantity of the lost data may not exceed the value of the allowable quantity of lost data predefined for each application.

20. A band control method for controlling the bands of a plurality of lines by means of a band control apparatus for relaying signals by using at least one of a plurality of lines, the band control apparatus being connected to some band control apparatus by way of the plurality of lines, the band control method being adapted to cooperate with the other band control apparatus to control the bands of the plurality of lines which include a first line and second lines, the method comprising:

a communication status gauging step that gauges the communication status of the own apparatus on the plurality of lines as first communication status;

a communication status acquisition step that acquires the communication status of the other band control apparatus on the plurality of lines as second communication status; and a band control step that computationally determines the line status of each of the lines according to the first communication status acquired by the communication status gauging step and the second communication status acquired by the communication status acquiring step and allocates the bands to be used for the relay to the plurality of lines according to the line statuses such that the first line and the second lines are used when a value of a band required for relaying signals exceeds the sum of values of the bands of the line status of the second lines and that only the second lines are used otherwise.

\* \* \* \* \*

UNITED STATES PATENT AND TRADEMARK OFFICE
CERTIFICATE OF CORRECTION

| | | |
|---|---|---|
| PATENT NO. | : 7,917,119 B2 | Page 1 of 1 |
| APPLICATION NO. | : 11/445145 | |
| DATED | : March 29, 2011 | |
| INVENTOR(S) | : Kunikazu Matsumoto | |

It is certified that error appears in the above-identified patent and that said Letters Patent is hereby corrected as shown below:

Column 12, Line 32 (Approx.), In Claim 14, after "information;" insert -- and --.

Signed and Sealed this
Twenty-fifth Day of October, 2011

David J. Kappos
*Director of the United States Patent and Trademark Office*